(12) United States Patent  
Miyamae et al.

(10) Patent No.: US 6,515,953 B1
(45) Date of Patent: Feb. 4, 2003

(54) PROCESSING METHOD OF A MASTER DISC FOR OPTICAL DISCS AND PROCESSING METHOD OF GROOVES

(75) Inventors: Akira Miyamae, Fujimi-machi; Hidemichi Furihata, Suwa; Hideaki Yamada, Shimo-suwa-machi, all of (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/534,133

(22) Filed: Mar. 23, 2000

(30) Foreign Application Priority Data

Mar. 25, 1999 (JP) .............................. 11-082587

(51) Int. Cl.[7] ................................ G11B 7/00
(52) U.S. Cl. .................................... 369/59.12
(58) Field of Search .................. 369/59.11, 59.12, 369/83, 116, 53.26, 59.23

(56) References Cited

U.S. PATENT DOCUMENTS 5,109,373 A * 4/1992 Ohno et al. ............... 369/100
5,327,411 A * 7/1994 Iwasa et al. ................ 369/59
5,469,422 A * 11/1995 Sohmuta ...................... 369/13
5,490,126 A * 2/1996 Furumiya et al. ............ 369/59
5,991,252 A * 11/1999 Kimura et al. ............... 369/59

FOREIGN PATENT DOCUMENTS

| JP | 06-302042 | 10/1994 |
| JP | 09-190656 | 7/1997 |
| JP | 10-177722 | 6/1998 |

* cited by examiner

Primary Examiner—Nabil Hindi
(74) Attorney, Agent, or Firm—Harness, Dickey & Pierce, P.L.C.

(57) ABSTRACT

Provided is a processing method of a master optical disc with an improved jitter and modulating degree of the reproduced signal, and a fine reading accuracy. In an exposure step for forming one pit by laser beam exposure of a plurality of pulse arrays, using the laser beam for exposure to an optical disc as an intermittent beam, the pulse length of the edges of a pit is made longer than the pulse length of the center portion. Moreover, the pulse interval behind the front edge pulse and/or the pulse interval in front of the rear edge pulse is longer than the pulse interval of the center portion.

10 Claims, 6 Drawing Sheets

PROCESSING METHOD OF A MASTER DISC FOR OPTICAL DISCS AND PROCESSING METHOD OF GROOVES

FIELD OF THE INVENTION

The present invention generally relates to processing steps of a master optical disc, and particularly to a processing method of a master optical disc, a stamper processed thereby, optical discs formed and manufactured with the stamper, and a processing method of grooves.

DESCRIPTION OF THE RELATED ART

An optical disc is generally prepared by transcribing a concave/convex pattern by the injection-molding method etc. using a stamper provided with such concave/convex pattern as tracking guides (grooves) and pits. The method conventionally adopted as a means to model a concave/convex pattern of such stamper is exposing and recording a laser beam onto a master disc coated with photosensitive material. To the photosensitive material sensitized by the above exposure, a concave/convex pattern is formed by development and a stamper is thereby prepared by plating the surface thereof such that the concave/convex pattern is transcribed onto the metal surface.

Figure 6:
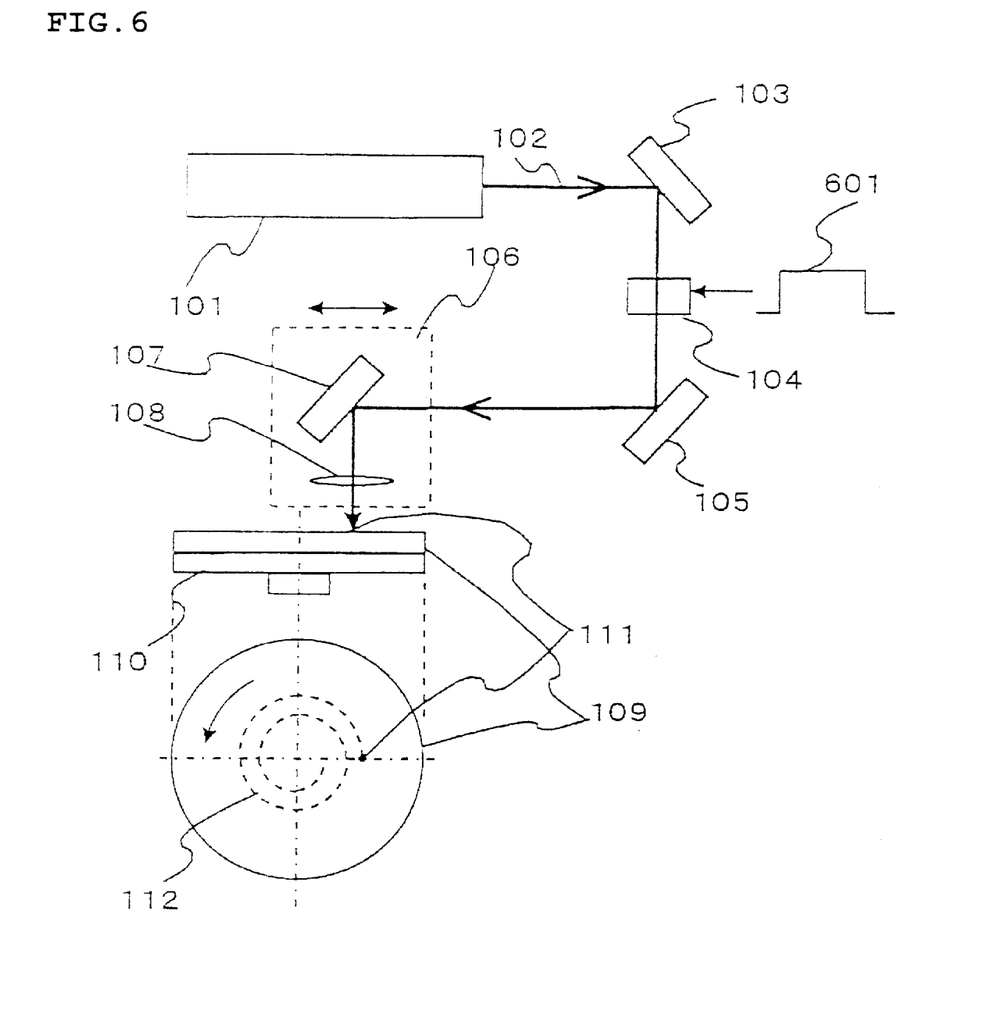
FIG. 6 shows an optical path indicating the entire constitution of the conventional processing method of a master optical disc.

FIG. 6 shows an optical path indicating a conventional processing method of a master optical disc. A laser beam 102 emitted from a laser device 101 is subjected to intensity modulation at an acousto-optical modulator 104 while reflecting at the mirrors 103, 105 and 107 and entering an objective lens 108. The modulating signal to be input to the acousto-optical modulator 104 is an input signal 601 turning on/off in accordance with the existence of a pit. The laser beam 102 transmitted through the objective lens 108 is converged at a master disc 109 coated with the photosensitive material and forms a spot 111 on the surface thereof. As a moving optical stand 106 provided with the objective lens 108 and mirror 107 gradually moves at a certain speed in the radial-direction of the master disc 109, the master disc 109 is loaded on a turntable 110 and turns simultaneously therewith. A spiral pit 112 is thus recorded on the master disc 109.

Regarding the shape of the pit 112, a short pit tends to be narrow and a long pit tends to be wide due to the interference of beams before and after the recording of the pit 112. Therefront, suggested are the method of recording compensation for changing the quantity of light in proportion to the pit length or the method of recording a long pit with intermittent beams as disclosed in Japanese Patent Laid-Open Publication No. HEI10-177722.

Figure 5:
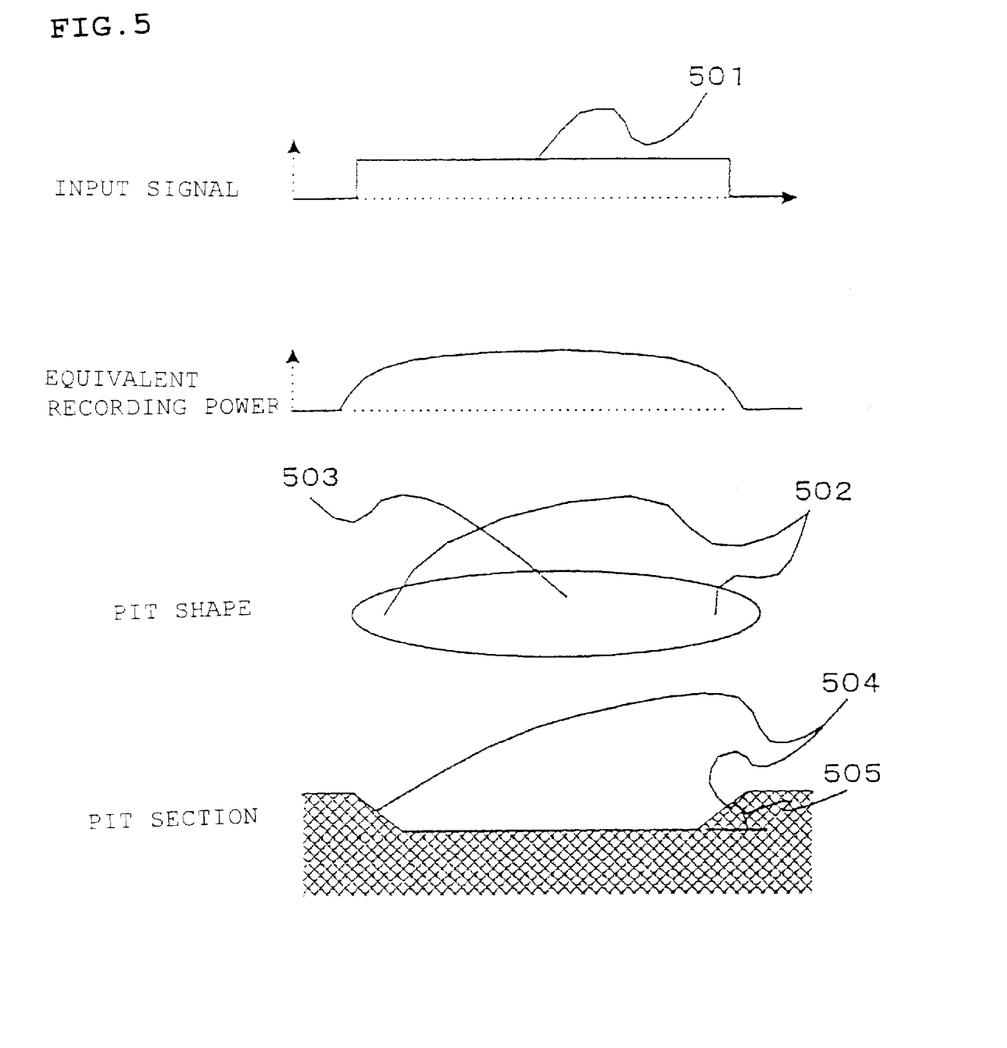
FIG. 5 shows the signal and pit shape used in conventional laser exposure.

In case of employing the conventional method above to form a pit, recording with an input signal 501 as shown in FIG. 5 causes a problem in that the center portion 503 of a pit becomes wider than the front and rear edges 502 (hereinafter simply referred to as the 'edges') of a pit due to the interference of beams and the characteristics of the resist. Unevenness in the width of a pit will cause adverse effects to the jitter and the modulation degree of a reproduced signal, and it will also lower the reading accuracy. Furthermore, the angle of the edge walls 504 of the pit becomes obtuse, and causes further aggravation of the jitter.

SUMMARY OF THE INVENTION

The present invention provides a processing method of a master optical disc by converging and exposing a laser beam to the master disc coated with photosensitive material, comprising an exposure method for forming one pit by exposing a laser beam composed of a plurality of pulse arrays with said laser beam being an intermittent beam, wherein the pulse length corresponding to the front edge of the pit and/or the pulse length corresponding to the rear edge of the pit is longer than the pulse length corresponding to the center portion of the pit. This processing method corrects the differences in width between the edges and the center portion of a pit, and it also makes the angle of the edges more acute. Therefore, it is possible to process a master optical disc having a fine jitter, a fine modulating degree and consequently fine reading accuracy.

The present invention provides a processing method of a master optical disc, wherein the pulse interval behind the pulse corresponding to the front edge of the pit and/or the pulse interval in front of the pulse corresponding to the rear edge of the pit is longer than the other pulse intervals of the pit. This processing method makes the angle of the edge walls 504 of a pit more acute and makes it possible to produce pits of a uniform width and further to operate a processing method of a master optical disc having a fine jitter.

Furthermore, the present invention provides a stamper manufactured by the aforementioned processing method. The present invention also provides optical discs manufactured using such stamper.

The present invention provides a processing method for forming grooves of a certain pattern by converging and exposing a laser beam to a master disc coated with photosensitive material, comprising a step for forming one groove by exposing a laser formed of a plurality of pulse arrays with said laser beam being an intermittent beam, wherein the pulse length corresponding to the front edge of one groove and/or the pulse length corresponding to the rear edge of said groove is longer than the pulse length corresponding to the center portion of said groove. This processing method corrects the differences in width between the edges and the center portion of a groove and also makes the angle at the edges more acute, and therefore it is possible to form grooves of high accuracy.

Furthermore, the present invention provides a processing method, wherein the pulse interval behind the pulse corresponding to the front edge of the groove and/or the pulse interval in front of the pulse corresponding to the rear edge of said groove is longer than the pulse interval of the center portion of said groove. This processing method makes the angle of the edge walls of the grooves more acute, and therefore it possible to form grooves of a uniform width and high accuracy.

DESCRIPTION OF THE PREFERRED EMBODIMENT

An embodiment according to the present invention will be hereinafter explained by referring to the drawings.
(Embodiment)

Figure 1:
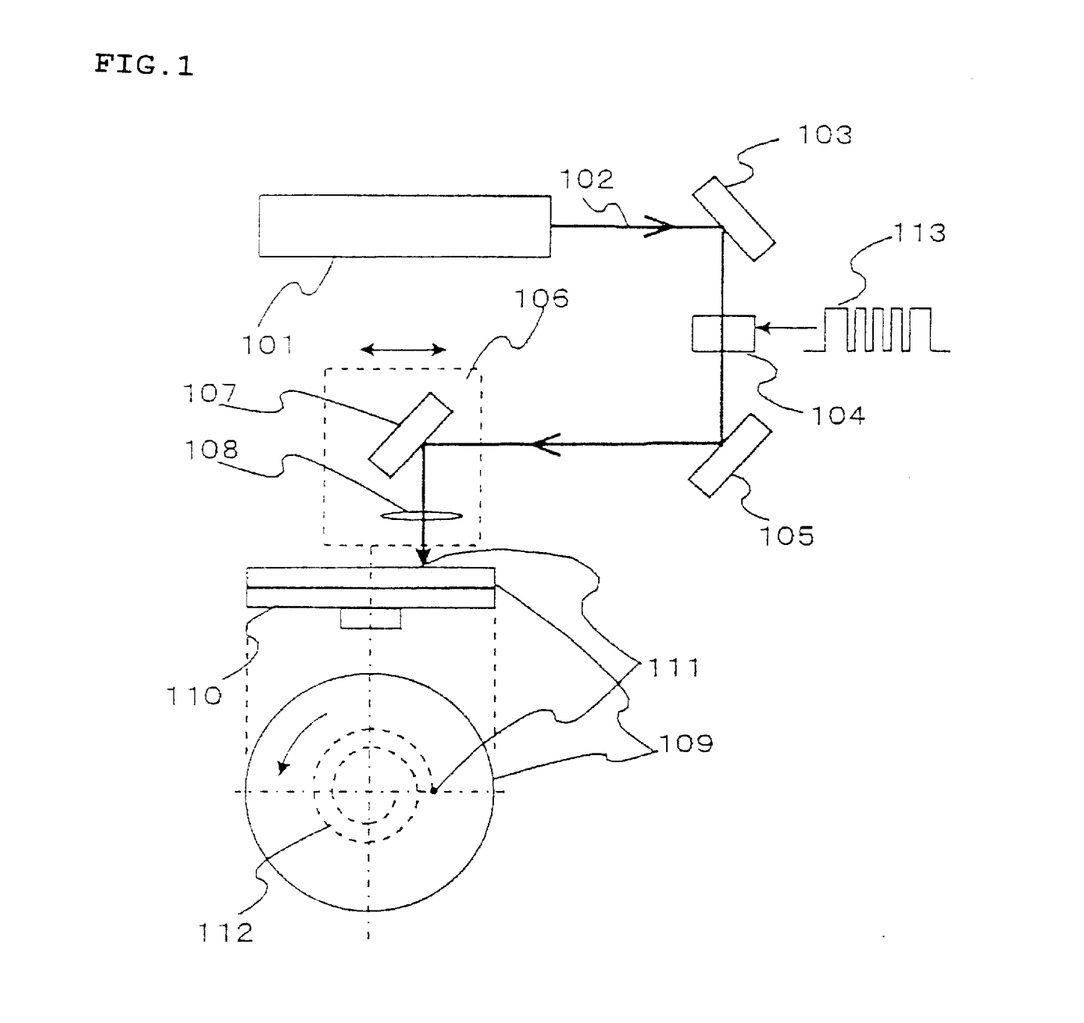
FIG. 1 shows an optical path indicating the entire constitution of the processing method of a master optical disc according to the present invention.
Figure 3:
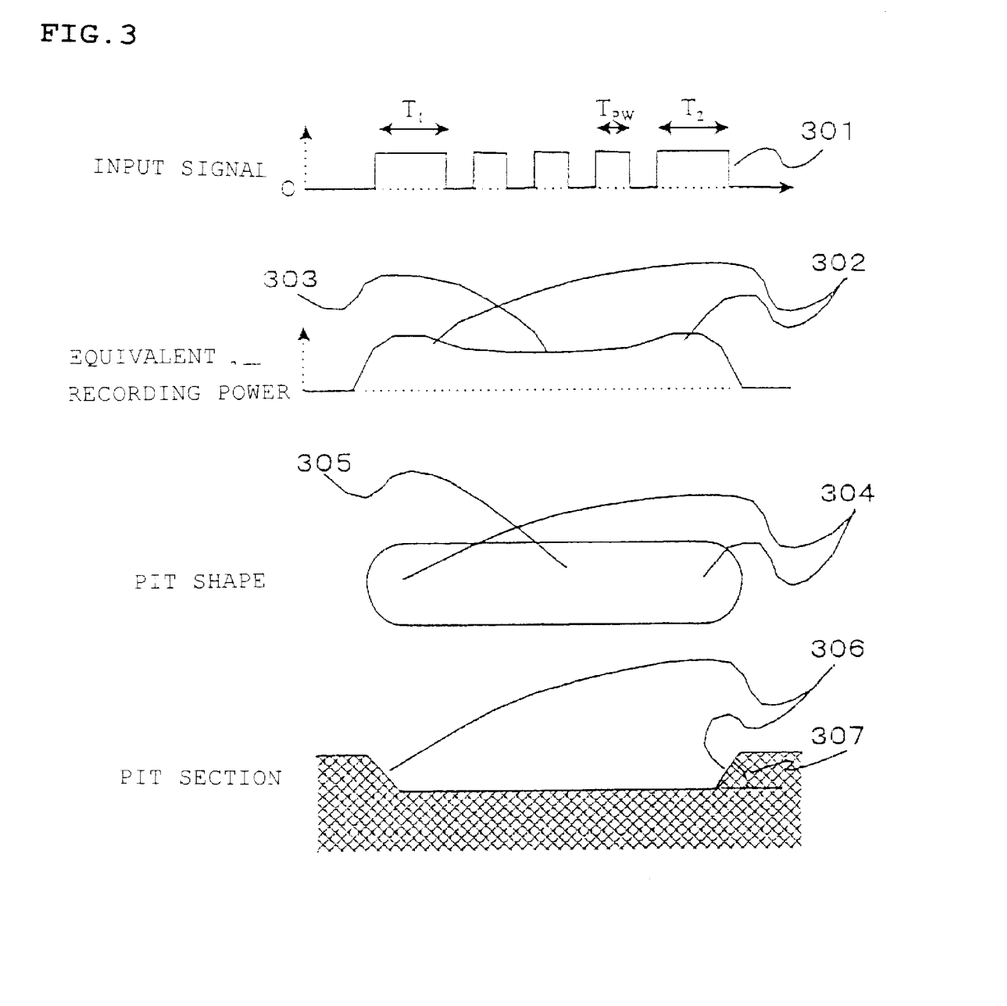
FIG. 3 shows the pulse array signal and the pit shape according to the present invention.

FIG. 1 shows an optical path indicating the processing method of a master optical disc relating to the embodiment of the present invention. A laser beam 102 emitted from a laser device 101 is subjected to intensity modulation at an acousto-optical modulator 104 while reflecting at the mirrors 103, 105, and 107 and entering an objective lens 108. An input signal 113 to be input to the acousto-optical modulator 104 is, as shown in FIG. 3, an intermittent pulse, wherein the pulse length of the edges is longer than the pulse length of the center portion. The modulated beam is the intermittent beam corresponding to the pulse length. The laser beam 102 transmitted through the objective lens 108 is converged at a master disc 109 coated with photosensitive material and forms a spot 111 on the surface thereof. As a moving optical stand 106 provided with the objective lens 108 and mirror 107 gradually moves at a certain speed in the radial-direction of the master disc 109, the master disc 109 is loaded on the turntable 110 and turns simultaneously therewith. Thus, a spirall pit 112 is recorded on the master disc 109.

Figure 2:
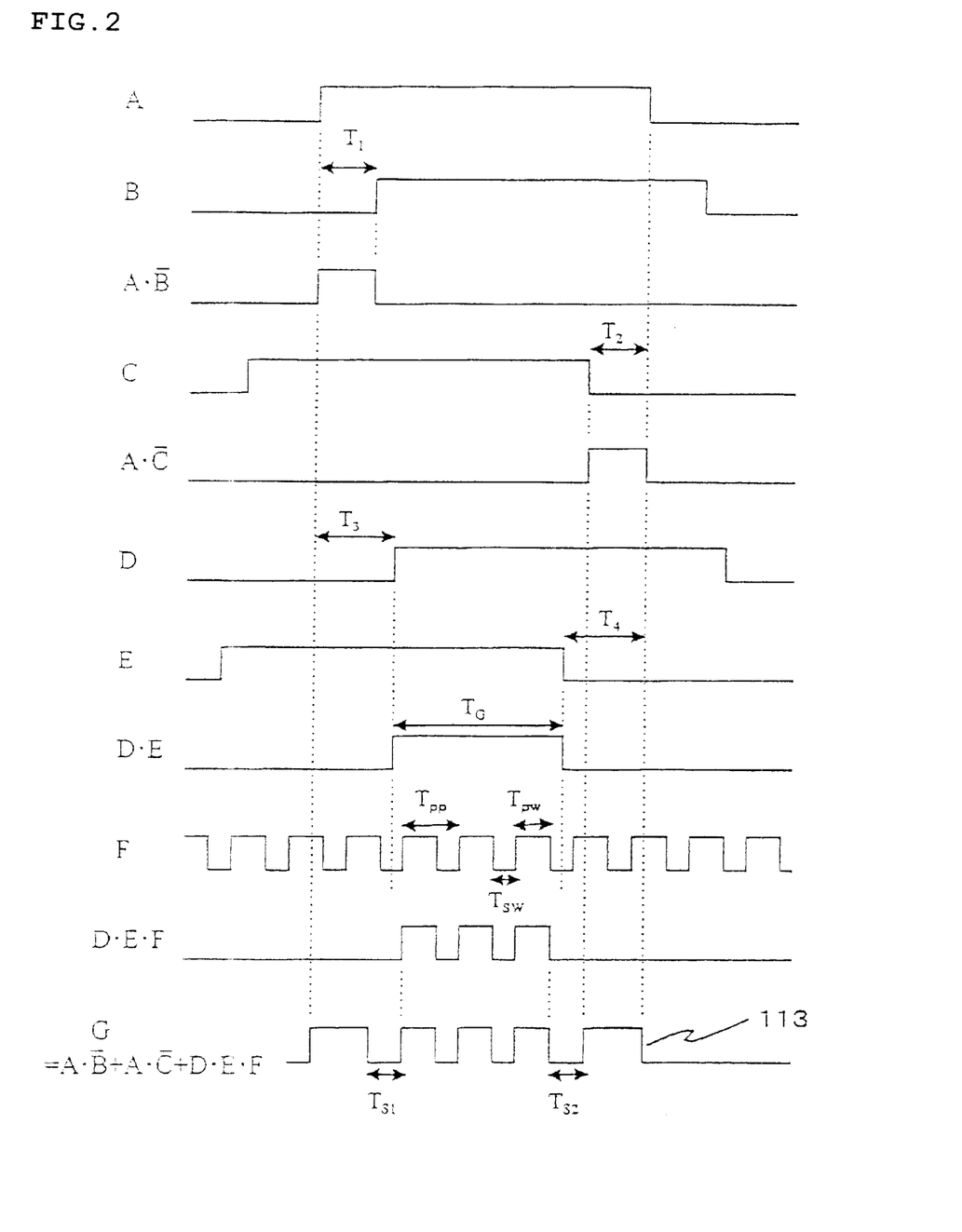
FIG. 2 shows the generation method of a pulse array signal according to the present invention.

FIG. 2 shows the generation method of an input signal 113 in the processing method of a master optical disc relating to the embodiment of the present invention. Signal A is the original signal turning on/off in accordance with the existence of a pit. B is the delayed signal of A delayed for T1. C is the advanced signal of A advanced for T2. D is the delayed signal of A delayed for T3. E is the advanced signal of A advanced for T4. F is the original signal of a high frequency pulse for generating an intermittent beam. G is the result of making the on/off of each signal respectively correspond to 1/0 and applying the logical calculation of A·B+A·C+D·E·F, and is the input signal 113 relating to the present invention. Regarding the input signal 113, the pulse lengths of the front and rear edges are determined respectively by T1 and T2. The pulse interval Ts1 behind the front edge pulse and the pulse interval Ts2 in front of the rear edge pulse are determined by T1, T2, cycle Tpp of the high frequency pulse F, pulse length Tpw, gate length TG, and phase differences between the high frequency pulse F and the original pit signal A. Therefront, the pulse lengths and the pulse intervals can be adjusted by arbitrarily setting the above items.

Upon inputting the input signal 113 into the acousto-optical modulator, the laser beam is subjected to pulse modulation and exposed and recorded to the master disc 109 as an intermittent beam. Here, if the cycle Tpp of the intermittent beam is converted to an exposure pitch on the master disc, it becomes a cycle sufficiently smaller than the optical spot diameter and, therefore, the produced pit is not in a pulse shape but in a successive shape. This result is the same as passing the laser beam through the low pass filter and, therefore, the process is equivalent to the PWM (Pulse Width Modulation) method. Consequently, obtained is the same effect as when the power becomes high at the long part of the pulse length and the power becomes low at the short part of the pulse length.

Upon applying the method of this invention at this stage, the recording power 302 at the edges is equivalently higher than the recording power 303 of the center portion, as shown in FIG. 3, because the pulse lengths T1 and T2 at the edges of the input signal 301 are longer than the pulse length Tpw at the center portion. Therefore, it is possible to correct the conventional problem of the phenomenon that the center portion 503 of a pit becoming wider than the edges 502, and to form pits of a uniform width.

Furthermore, the angle 307 of the edge walls 306 becomes acute because the recording power of the edges 304 of a pit becomes equivalently high, and it is therefore possible to form an optical disc with a fine jitter.

Figure 4:
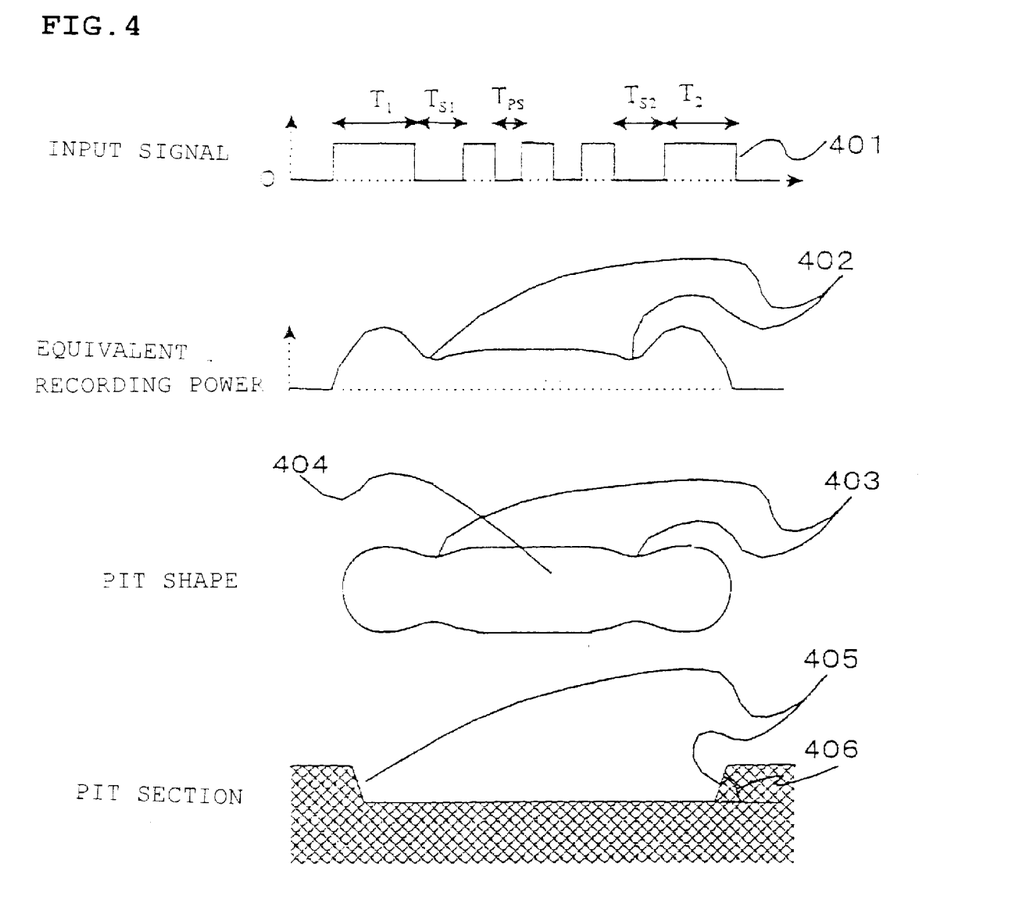
FIG. 4 shows the pulse array signal and the pit shape according to the present invention.

Moreover, in case of making the pulse lengths T1 and T2 of the edges of a pit of the input signal 401 longer than the aforementioned corrected amount as well as making the angle of the walls 405 more acute as shown in FIG. 4, a reduced-recording power part 402 appears between the edges 403 and the center portion 404 of a pit, having an effect to correct the phenomenon of the edges becoming wider than the center portion because the pulse interval Ts1 behind the front edge pulse and the pulse interval Ts2 in front of the rear edge pulse are longer than the pulse interval Tps of the center portion. Furrowings 403 are formed in the reduced-recording power part 402, but not to the extent of affecting the reproduced signal. As a result, it is possible to form an optical disc of a uniform width having a more acute angle 406 of the edge walls 405 and a finer jitter.

As clear from the explanation above, in the exposure step for forming one pit with laser beam exposure of a plurality of pulse arrays as an intermittent beam, the present invention makes the pulse lengths at the edges of a pit longer than the pulse length at the center portion. Therefore, the phenomenon of the center portion of a pit becomes wider than the edges is corrected and it is therefore possible to form a pit of a uniform width. Moreover, because the wall angle of the edges is more acute, the jitter and the modulating degree of the reproduced signal are improved and it is possible to provide a processing method of a master optical disc with high reading accuracy.

Furthermore, by making the pulse length at the edges of the pit longer than the aforementioned corrected amount as well as making the wall angle more acute, the pulse interval behind the front edge pulse and the pulse interval in front of the rear edge pulse will become longer than the pulse interval of the center portion. Thus, the phenomenon of the edges of a pit conversely becoming wider than the center portion is corrected, the pit will have a uniform width, the angle of the edge walls will become more acute, and it is therefore possible to provide a processing method of a master disc for optical discs with a finer jitter.

What is claimed is:

1. A processing method of a master optical disc by converging and exposing a laser beam to the master disc coated with photosensitive material, comprising an exposure method for forming one pit by exposing a laser beam composed of a plurality of pulse arrays with said laser beam being an intermittent beam, wherein a pulse length corresponding to a front edge of the pit and a pulse length corresponding to a rear edge of the pit are longer than a pulse length corresponding to a center portion of the pit; and a pulse interval different from and just after the pulse corresponding to the front edge of the pit and a pulse interval different from and just before the pulse corresponding to the rear edge of the pit are longer than a pulse interval of the center portion of the pit.

2. A stamper manufactured by the processing method according to claim 1.

3. An optical disc manufactured using a stamper according to claim 2.

4. A processing method for forming grooves of a certain pattern by converging and exposing a laser beam to a master medium coated with photosensitive material, comprising a step for forming one groove by exposing a laser formed of a plurality of pulse arrays with said laser beam being an intermittent beam, wherein a pulse length corresponding to a front edge of one groove and a pulse length corresponding to a rear edge of said groove are longer than a pulse length corresponding to a center portion of said groove; and a pulse interval different from and just after the pulse corresponding to the front edge of the groove and a pulse interval different from and just before the pulse corresponding to the rear edge of said groove are longer than a pulse interval of the center portion of said groove.

5. A processing method according to claim 1, wherein said pulse arrays create an acute angle along said front and rear edges.

6. A processing method according to claim 1, wherein a recording power of said pulse arrays at the front and rear edges is higher than a recording power at the center portion.

7. A processing method according to claim 4, wherein said pulse arrays create an acute angle along said front and rear edges.

8. A processing method according to claim 4, wherein a power of said pulse arrays at the front and rear edges is higher than a power at the center portion.

9. A processing method for a master optical disc including converging and exposing a laser beam to the master disc coated with photosensitive material, comprising an exposure method for forming one pit by exposing a laser beam composed of a plurality of pulse arrays with said laser beam being an intermittent beam, wherein a pulse length corresponding to a front edge of the pit and a pulse length corresponding to a rear edge of the pit are longer than a pulse length corresponding to a center portion of the pit;

a pulse interval different from and just after the pulse corresponding to the front edge of the pit and a pulse interval different from and just before the pulse corresponding to the rear edge of the pit are longer than a pulse interval of the center portion of the pit;

said front and rear edges are formed at acute angles; and a recording power of the pulse arrays at the front and rear edges is higher than a recording power at the center portion.

10. An optical disc manufactured by using a master disc according to claim 9.

* * * * *

UNITED STATES PATENT AND TRADEMARK OFFICE
CERTIFICATE OF CORRECTION

PATENT NO. : 6,515,953 B1
DATED : February 4, 2003
INVENTOR(S) : Miyamae et al.

It is certified that error appears in the above-identified patent and that said Letters Patent is hereby corrected as shown below:

Column 1,
Line 48, please delete "Therefront" and substitute -- Therefore --;

Column 2,
Line 50, please change "it" to -- is --;

Column 3,
Line 24, please delete "spirall" and substitute -- spiral --; and
Line 45, please delete "Therefront" and substitute -- Therefore --.

Signed and Sealed this

First Day of July, 2003

JAMES E. ROGAN
*Director of the United States Patent and Trademark Office*